Dec. 29, 1942.    B. MILLER    2,306,553
NATURAL GAS CONDITIONING PROCESS
Filed Sept. 23, 1940
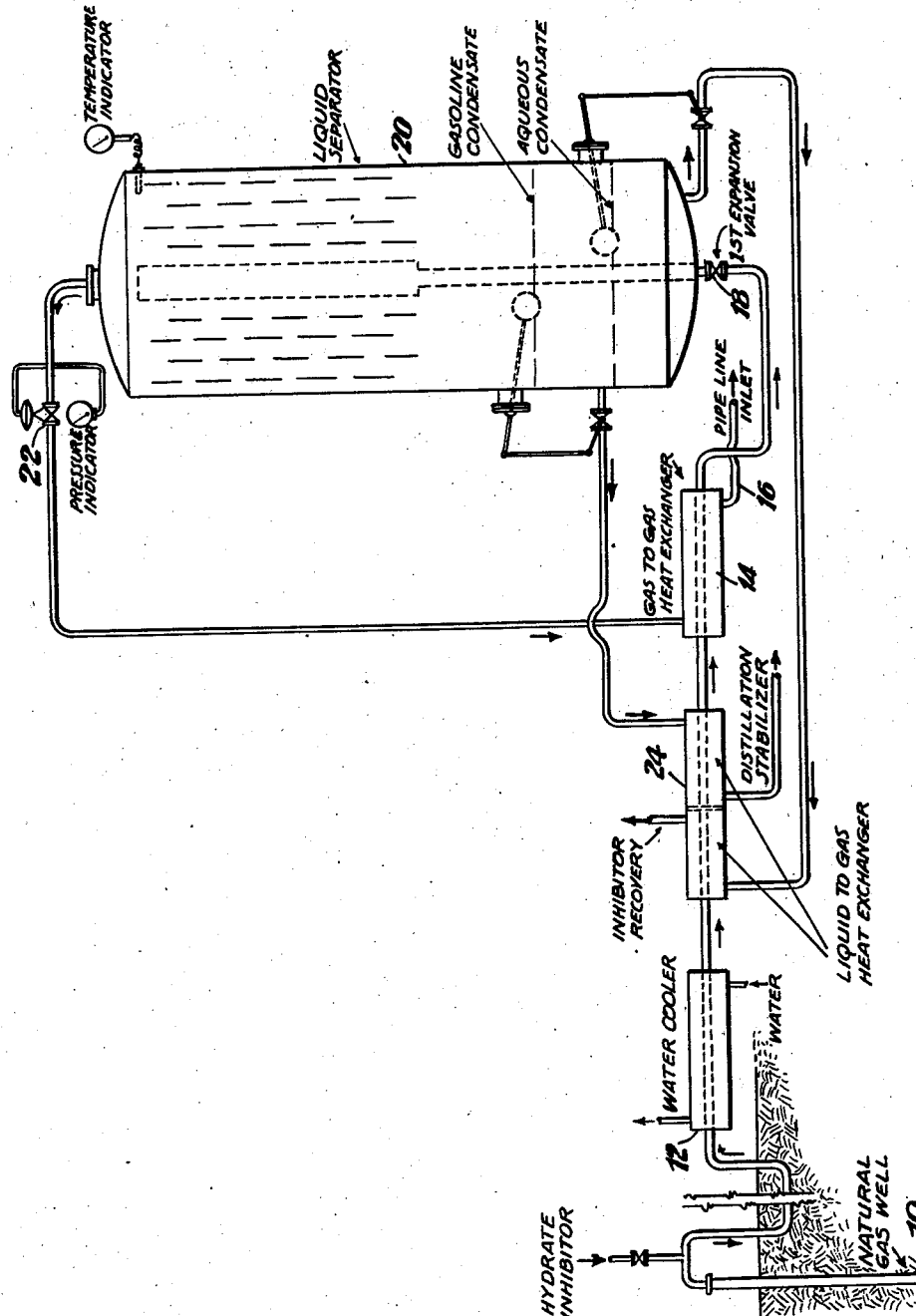
INVENTOR
BENJAMIN MILLER
BY
ATTORNEY Patented Dec. 29, 1942

2,306,553

UNITED STATES PATENT OFFICE 2,306,553

NATURAL GAS CONDITIONING PROCESS

Benjamin Miller, Richmond Hill, N. Y., assignor to Cities Service Oil Company, New York, N. Y., a corporation of Pennsylvania Application September 23, 1940, Serial No. 358,038

2 Claims. (Cl. 62—175.5)

This invention relates generally to the separation of liquefiable hydrocarbons from natural gas, and is particularly directed to an improved method for preparing natural gas produced under very high pressure from so-called "distillate" wells, for pipeline transportation. Most natural gas as produced carries a certain proportion of vapors of liquefiable hydrocarbons which must be removed before transporting the gas through a pipeline in order to avoid interference with the normal operation of the line by condensation therein, and in order to avoid the danger of the presence of such liquid hydrocarbons in the gas at the point of consumption.

Natural gas is generally treated at or near the point of production for the recovery of liquefiable hydrocarbons including natural gas gasoline. Natural gas gasoline may be recovered from natural gas in certain localities and at certain times because of its value as a liquid fuel, and such recovery may be profitable even though the natural gas from which the gasoline is stripped has no available market and must be either discarded or returned to the underground reservoir from which it was originally produced. On the other hand it may be necessary to extract liquefiable hydrocarbons including natural gas gasoline from gas which is to be transported through a pipeline even though the cost of extracting such liquefiable hydrocarbons is greater than the value of the material extracted. The expense of such extraction may only be warranted by the necessity of producing a gas which can be transported in pipelines and utilized without inconvenience or hazard.

The conventional method for separating liquefiable hydrocarbons from natural gas which is to be transported by pipeline is the so-called absorption process which involves reducing the pressure of the gas to that at which the gas is to be introduced into the pipeline, and then processing the gas by oil solvent absorption for the recovery of liquefiable constituents. The oil absorption process is very efficient for separating from natural gas substantially all of the butane and higher hydrocarbons, and an appreciable fraction of isobutane and propane. However, a plant for practicing the absorption process involves a large capital expenditure, and can only be justified economically when there is a very large volume of natural gas to be treated, or when the natural gas to be treated carries a high content of marketable natural gas gasoline. In general the market value of natural gas gasoline at the producing point is so low that it is uneconomical from the standpoint of the gasoline recovery alone to process a gas containing only a few tenths of a gallon of natural gas gasoline per 1000 cu. ft., even though several hundred million cubic feet of such gas are available per day for treatment. On the other hand, it is generally uneconomical to treat the gas from individual wells or from small groups of wells in a producing area, even though such gas may contain as much as ½ to 1 gallon per 1000 cu. ft., where only a few million cubic feet per day of such gas are available for treatment.

Within the last few years several so-called "distillate" natural gas fields have been discovered in which the gas is produced under extremely high pressure of the order of 3000 pounds per square inch. If natural gas followed the simple gas laws, such gas is produced at 3000 pounds gas pressure would carry so little liquefiable hydrocarbon that it would not have to be treated for pipeline transportation. However, it has been known for sometime that the hydrocarbon mixture which is present in ordinary natural gas does not conform to the simple gas laws at pressures ranging upwardly from a minimum of 500–1000 lbs. per square inch, depending upon the temperature and composition of the gas. The pressure range within which natural gas does not follow the ordinary gas laws is called the "retrograde condensation range." Within the range of retrograde condensation the high pressure natural gas may contain a considerable quantity of liquefiable hydrocarbons, and these hydrocarbons can be condensed by simply lowering the pressure of the gas within the range of retrograde condensation, without lowering the gas temperature. On the other hand, at the low pressure of only 300 to 500 pounds at which natural gas is usually introduced to a transportation pipeline, the natural gas from so-called "distillate" fields follows the simple gas laws. In other words, natural gas at these lower pressures, on having its pressure further reduced while maintaining the temperature constant, will evaporate natural gas gasoline hydrocarbons in contact therewith.

Thus natural gas which is under pressure within the retrograde condensation range behaves in a reverse manner to the same gas at lower pressure where the simple gas laws apply, and this phenomenon of retrograde condensation as applied to high pressure natural gas, has been used as the basis of another process for treating natural gas from high pressure fields which is not to be subjected to pipeline transportation, but which is to be recycled to the underground structure after removal of its natural gasoline content. According to this second process liquefiable hydrocarbons are condensed from the high pressure gas by subjecting the gas to a partial lowering of temperature, with some reduction of pressure but not below the retrograde condensation limits. The thus-treated gas is then returned to the underground reservoir from which it came or to another underground reservoir. While the recovery of liquid by this second "recycle" process is not as great as it would be were the absorption method employed, it nevertheless may be more profitable because of the much lower capital investment for the equipment necessary for its practice. The process is based on the phenomenon of retrograde condensation, and is practiced within the range of pressures where an increase in separation of liquid occurs with a pressure drop as well as with a temperature drop.

The second process of separating natural gas gasoline from gas which is to be recycled (above referred to) is necessarily not as efficient as the absorption process now generally used for separating liquefiable hydrocarbons from gas which is to be transported by pipeline. One reason for this is that the maximum separation of liquefiable hydrocarbons from natural gas by a process based on the retrograde condensation phenomenon would occur at such a low pressure as to involve unduly expensive compression equipment for recompressing the gas to the recycling or reservoir pressure. Thus if the reservoir pressure is assumed to be 3000 lbs. per square inch, and if the pressure at which maximum separation of liquefiable hydrocarbons be in the neighborhood of 900 lbs. per square inch at the reservoir temperature, it would probably be uneconomical to operate the separating chamber of the recycle treating process at a pressure substantially lower than say 1500 lbs. per square inch; this for the reason that the retrograde condensate does not increase so rapidly as does the power required for recompressing the gas as the pressure decreases. In order to increase the recovery of retrograde condensate without undue pressure drop, recourse may be had to refrigeration. The actual quantity of condensate may be increased by refrigeration, but the relative quantity is very frequently decreased because of the fact that in general the pressure at which maximum condensation takes place drops proportionately with any drop in temperature.

The primary object of the present invention is to provide an improved economical process for separating liquefiable hydrocarbons from natural gas produced in high pressure "distillate" wells as a preliminary to pipeline transportation. It will be understood that the process of the present invention has particular application and utility for stripping natural gas from "distillate" wells of its liquid hydrocarbon content so as to condition it for pipeline transportation, in cases where the amount and value of liquid condensate recoverable may be so low and the amount of gas available for treatment at one point may be so small, comparatively, that application of the absorption process would be less economical. By application of the present process, liquefiable hydrocarbons may be separated from the gas in amount sufficient to put it in safe condition for transportation and use. Thus the present process effects a much more complete separation of liquid from the gas than that heretofore effected by application of the retrograde condensation phenomenon to the treatment of gas which is to be recycled.

With the foregoing and other objects and features in view, the invention consists of the improved process for conditioning natural gas for pipeline transportation which is hereinafter described and more particularly defined by the accompanying claims.

The process will now be described with reference to the accompanying flow sheet which illustrates an apparatus arrangement adapted for the practice of the process.

The process of the present invention is directed particularly to the treatment of natural gas under high pressures within the retrograde condensation range. Such gas as produced from a well 10 carries a temperature substantially exceeding atmospheric temperature. The first step of the process is therefore to cool the gas to normal atmospheric temperature, or to a temperature which can be attained by available air and water cooling, as in cooler 12. In order to avoid formation of natural gas hydrates during this preliminary cooling operation as a result of the presence of moisture in the gas, it is usually desirable to add to the gas before cooling it a hydrate inhibitor such as methyl alcohol, or a dehydrating agent such as a concentrated aqueous solution of calcium chloride.

After passing through the preliminary cooling step, the gas is subjected to a refrigeration cooling operation by passing it through a gas-to-gas heat exchanger 14 in indirect heat transfer relation to previously expanded gas on its way to the inlet 16 of the transportation pipeline. The thus refrigerated gas is then conducted past an expansion valve 18 into an expansion and condensing chamber 20 wherein it is expanded down to the lower limit of the retrograde condensation range of pressures at the temperature of the thus expanded gas. For most natural gas the pressure limit of this expansion lies in the range between 600 and 800 lbs. per square inch, at temperatures in the neighborhood of 10° to 50° F. The expansion is preferably carried out in a chamber equipped with baffles and of sufficient size to allow for complete condensation of liquefiable hydrocarbons and mechanical separation of the condensed liquids from the expanded gas within the expansion chamber. Liquids thus collected in the bottom of the expansion chamber can be separated by settling into two layers, an aqueous layer of hydrate inhibitor and a layer of unstabilized natural gas gasoline.

From the top of the expansion chamber the thus partially expanded gas is conducted past a second expansion valve 22 which is set to allow further expansion of the gas to the pressure at which it is desired to feed the gas to the inlet of the transportation pipeline. This second expansion effects a further drop in temperature of the gas body, and the expanded and cooled gas is then passed through the gas-to-gas heat exchanger 14 in indirect heat transfer relation with a fresh portion of high pressure gas; the finally expanded gas serving as the refrigeration means for cooling such high pressure gas.

Since the pressure of the gas is reduced in the separator or expansion chamber 20 to the lower limit of the retrograde condensation pressure range for the gas at the temperature therein obtaining, maximum condensation of liquefiable hydrocarbons from the gas takes place within the expansion chamber, and it is necessary to remove the gas from the expansion chamber out of contact with condensed liquids before further expanding the gas down to a pressure suitable for pipeline transportation below the retrograde condensation range. Since the aqueous and gasoline condensates which are removed from the gas in the expansion chamber have a relatively low temperature at the point at which condensation takes place, these liquids may, if desired, be circulated through a liquid to gas heat exchanger 24 in heat transfer relation to the unexpanded gas on its way to the expansion chamber to obtain some additional refrigeration effect, before conducting the condensates to distillation equipment for stabilization of the gasoline and for regeneration of the hydrate inhibitor.

By the present process the gas is expanded in two stages. The first expansion occurs in the liquid separator wherein the pressure drop is from the producing well pressure down to the pressure of maximum retrograde condensation for the particular gas being treated at the temperature obtaining in the separator. In general, the lower that temperature is, the lower is the pressure at which maximum condensation occurs. The additional temperature drop of the gas which takes place during the second stage of expansion from the pressure in the separator down to pipeline pressure, is used to produce additional cooling effect, by interchange, on the gas undergoing cooling on its way to the separator, and this additional cooling results in the recovery within the separator of an additional quantity of liquid hydrocarbon. The principal advantage of this additional separation of liquid is that its removal from the gas is frequently a determining factor in finally conditioning the gas for pipeline transportation.

The refrigerating effect of the second stage of expansion from separator pressure down to pipe line pressure depends on the separator temperature and on the separator pressure, if the pipeline pressure is fixed. In general, the higher the pressure in the separator and the lower the temperature, the greater will be the cooling effect of further expansion. While the cooling effect of the second expansion is greater if the separator pressure is kept high, it is also the case that a high separator pressure will result in liquefiable hydrocarbon being left in the gas which could have been liquefied if a lower separator pressure had been maintained. There is, therefore, for any particular gas at a particular initial pressure and initial temperature, and for any definite pipeline pressure, one best pressure at which to operate the separator. This best separator pressure or optimum pressure is that pressure which results in the maximum separation of liquid from the gas at the lowest separator temperature. It is possible in starting up operation of the plant to determine the optimum separator pressure by following the separator temperature. In starting operation of the process, the initial expansion stage is allowed to take place through only a relatively small pressure drop, a large pressure drop being taken in the second expansion stage. In other words, the process is first started up with a relatively high separator pressure. At the beginning of operations, the separator temperature will fall and then will become constant as equilibrium is reached. After the separator temperature has become constant, the separator pressure is reduced again and the separator temperature is again watched until it has dropped to a constant equilibrium point. This method of adjustment is continued with each increment of separator pressure drop being followed by a period of establishing temperature equilibrium. Eventually a slight drop in separator pressure will result in an increase in separator temperature. When this occurs, the indication is that the optimum separator pressure has been passed. The separator pressure is then increased slightly to bring the separator temperature to a minimum point which indicates optimum separator pressure.

Having thus described the invention, what is claimed as new is:

1. In a process for separating liquefiable hydrocarbon constituents from natural gas during expansion of the gas from a high pressure within the retrograde condensation range to a pressure suitable for pipeline transportation below the retrograde condensation range, the steps comprising directing a stream of said gas from the well toward a separating zone, refrigerating said stream, partially expanding the refrigerated stream down to approximately the lower limit of the retrograde condensation range at the thus lowered temperature and separating the stream in said zone into a gaseous component and liquid hydrocarbons condensed in said expansion, further expanding the separated gaseous component below 500 pounds per square inch to the desired transportation pressure after removing it from the separating zone, and effecting part of said refrigeration by passing the further expanded gaseous component in heat exchange relation with the gas stream proceeding toward said separating zone.

2. In a process for separating liquefiable hydrocarbon constituents from natural gas during expansion of the gas from a high pressure within the retrograde condensation range to a pressure suitable for pipeline transportation below the retrograde condensation range, the steps comprising, cooling the high pressure gas, partially expanding the cooled gas down to approximately the lower limit of the retrograde condensation range at the thus lowered temperature and separating therefrom liquid hydrocarbons thereby condensed, further expanding the gas to the desired transportation pressure after removing it from the liquid separating zone, intensifying said initial cooling operation by passing the thus expanded gas in heat exchange relation with a fresh portion of gas to be treated, and at the beginning of operations determining the optimum pressure to be maintained in the liquid separating zone by gradually dropping the pressure of the first expansion stage in increments, allowing the temperature in the separating zone to reach equilibrium after each increment pressure drop, and locating the pressure of maximum retrograde condensation as that below which a temperature rise occurs in the separating zone after an increment pressure drop.

BENJAMIN MILLER.